United States Patent [19]
Kim

[11] Patent Number: 6,134,526
[45] Date of Patent: Oct. 17, 2000

[54] APPARATUS AND METHOD FOR REPRODUCING RECORDED SIGNALS BY USING RECORDING MEDIUM

[75] Inventor: Yong Ho Kim, Kyungki-do, Rep. of Korea

[73] Assignee: Samsung Electronics Co., Ltd., Kyungki-Do, Rep. of Korea

[21] Appl. No.: 09/072,556

[22] Filed: May 5, 1998

[30] Foreign Application Priority Data

May 13, 1997 [KR] Rep. of Korea ........................ 97-18579

[51] Int. Cl.⁷ ................................. G10L 9/06; G09B 5/00
[52] U.S. Cl. ........................ 704/246; 704/278; 434/156; 434/307 A; 434/308; 84/634
[58] Field of Search ..................... 704/246, 278; 434/156, 307 A, 308; 84/634

[56] References Cited

U.S. PATENT DOCUMENTS

| | | | |
|---|---|---|---|
| 5,343,531 | 8/1994 | Muraoka | 381/1 |
| 5,569,038 | 10/1996 | Tubman et al. | 434/308 |
| 5,820,384 | 10/1998 | Tubman et al. | 434/308 |

*Primary Examiner*—David R. Hudspeth
*Assistant Examiner*—Susan Wieland
*Attorney, Agent, or Firm*—Sughrue, Mion, Zinn Macpeak & Seas, PLLC

[57] ABSTRACT

An apparatus for reproducing recorded signals by using a recorded medium and a method for reproducing recorded signals. The learning of language is done by using the general recorded medium such as cassette tape and video tape with movies or music recorded thereon, thereby improving the learning efficiency. In the method for reproducing recorded signals of a recording medium in a language learning apparatus, the operation is carried out in the following manner. A control section switches a first switch in accordance with a reproduction command of a reproduction key inputting section, so that the audio signals of an audio signal processing section would be supplied to a speaker. Further, the control section turns on a second switch in accordance with a voice recognition command of a voice recognition key inputting section, so that the voices of a voice detecting section would be supplied and stored to a voice recognizing section. Further, the control section compares a pre-stored voice of the voice recognizing section with the voices of the voice detecting section, and makes the output signals of the adder supplied to the speaker by switching the first switch. During the time when the recorded signals such as movies or music are reproduced from the cassette tape or video tape, if the user wants, the vocal sounds are suppressed, and his or her own voice can be outputted together with the background sounds. In this manner, an actual conversation can be carried out with an actor of the movie, thereby improving the learning efficiency.

3 Claims, 2 Drawing Sheets

APPARATUS AND METHOD FOR REPRODUCING RECORDED SIGNALS BY USING RECORDING MEDIUM

BACKGROUND OF THE INVENTION

1. Field of the Invention

The present invention relates to an apparatus and method for reproducing recorded signals. More specifically, the present invention relates to an apparatus to facilitate learning a language by using a recorded medium, and a method for reproducing recorded signals, in which the learning of language is done by using a general recorded medium such as a cassette tape, digital video disk(DVD) and video tape with movies or music recorded thereon, thereby improving learning efficiency.

2. Description of the Prior Art

Generally, the conventional language learning apparatus requires a recorded medium such as a cassette tape, digital video disk and video tape having control characters marked at predetermined positions on the recording medium during their manufacturing.

If the marked control character is encountered during the reproduction, then the reproducing operation is ceased. During this interval, the user inputs a repetition of the preceding reproduced sounds through a sound inputting section.

Therefore, the user can listen to his (or her) own voice which is reproduced through the speaker, and therefore, the learning efficiency can be improved.

However, the above described learning efficiency cannot be obtained using general recording mediums. Rather a recorded medium with marked control characters have to be used, if the above described effect is to be obtained.

SUMMARY OF THE INVENTION

The present invention is intended to overcome the above described disadvantage of the conventional technique.

Therefore it is an object of the present invention to provide an apparatus and method for reproducing recorded signals, in which learning a language can be done in a conversation form even with the general recorded medium such as cassette tapes and video tapes with movies or music recorded thereon.

In achieving the above object, the apparatus for reproducing recorded signals using a recorded medium according to the present invention includes: an audio signal processing section for reproducing audio signals; a background sound detecting section for detecting background sounds from output audio signals of the audio signal processing section; a voice inputting section for inputting a voice of a user; an adder for adding the user's voice of the voice inputting section to background sounds of the background sound detecting section; a first switch for switching the output audio signals of the audio signal processing section and the signals of the adder to supply them to a speaker; a voice detecting section for detecting a voice from output audio signals of the audio signal processing section; a voice recognizing section for recognizing and detecting the voices of the voice detecting section; and a second switch for turning on-off to control supply of the output voices of the voice detecting section to the voice recognizing section. The apparatus further includes a reproduction key inputting section for inputting user's reproduction commands; a voice recognition key inputting section for inputting user's voice recognition commands; and a control section for making audio signals outputted to the speaker by switching the first switch in accordance with the reproduction commands of the reproduction key inputting section, for making the detected voices of the voice detecting section supplied to the voice recognizing section by turning on the second switch in accordance with the voice recognition commands of the voice recognition key inputting section, for comparing a pre-stored voice of the voice recognizing section with the voices of the voice detecting section; and for making output signals of the adder supplied to the speaker by switching the first switch.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

A preferred embodiment of the apparatus and method for reproducing recorded signals according to the present invention will be described referring to FIGS. 1 and 2.

Figure 1:
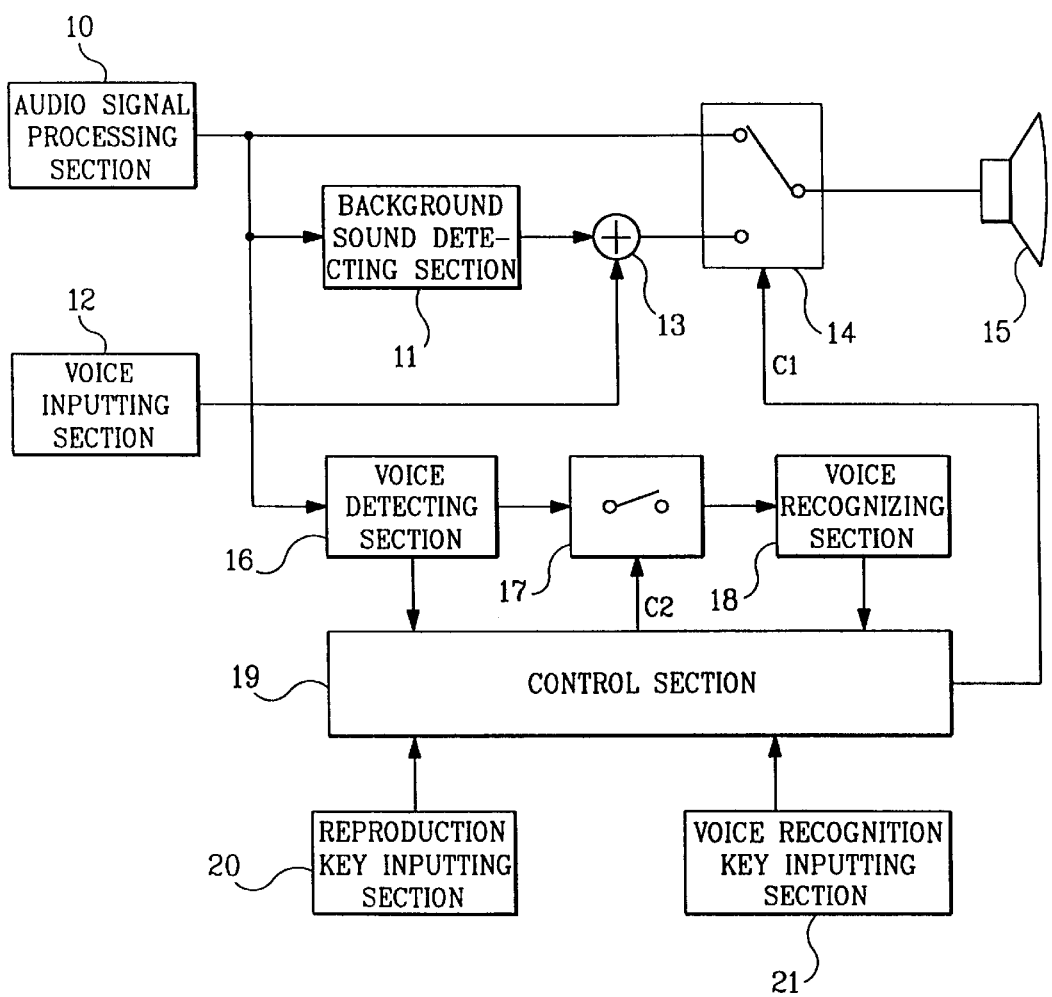
FIG. 1 illustrates the constitution of the language learning apparatus using recorded medium according to the present invention.

FIG. 1 illustrates the apparatus for reproducing a recorded signals using recorded medium according to the present invention.

As shown in the drawing, an audio signal processing section 10 reproduces and outputs the audio signals of a recorded medium (not shown in the drawing).

Further, a background sound detecting section 11 detects background sounds from the output audio signals of the audio signal processing section 10. A voice inputting section 12 inputs the voice of a user. An adder 13 adds the user's voice from the voice inputting section 12 to the background sounds of the background sound detecting section 11.

A first switch 14 switches the output audio signals of the audio signal processing section 10 by control signal C1 and the signals of the adder 13 to supply them to a speaker 15. This first switch 14 is controlled by a control section 19 which is to be described later.

A voice detecting section 16 detects a voice from the output audio signals of the audio signal processing section 10.

A voice recognizing section 18 recognizes and detects the voices of the voice detecting section 16. A second switch 17 turns on-off to control supply of the output voices of the voice detecting section 16 to the voice recognizing section 18.

A reproduction key inputting section 20 inputs user's reproduction commands. A voice recognizing key inputting section 21 inputs user's voice recognition commands.

The control section 19 controls the output of audio signals to the speaker 15 by switching the first switch 14 in accordance with the reproduction commands of the reproduction key inputting section 20. Further, the control section 19 controls the supply of the detected voices of the voice detecting section 16 to the voice recognizing section 18 by turning on the second switch 17 in accordance with the voice recognition commands of the voice recognition key inputting section 21. Further, the control section 19 compares a pre-stored voice of the voice recognizing section 18 with the voices of the voice detecting section 16, and controls the output of signals from the adder 13 to the speaker 15 by switching the first switch 14.

Preferably the background sound detecting section 11 consists of a high pass filter HPF. The voice detecting section 16 preferably consists of a low pass filter LPF. The control section 19 consists of a microcomputer.

Now the method for learning languages based on the above described apparatus according to the present invention will be described referring to FIG. 2.

Figure 2:
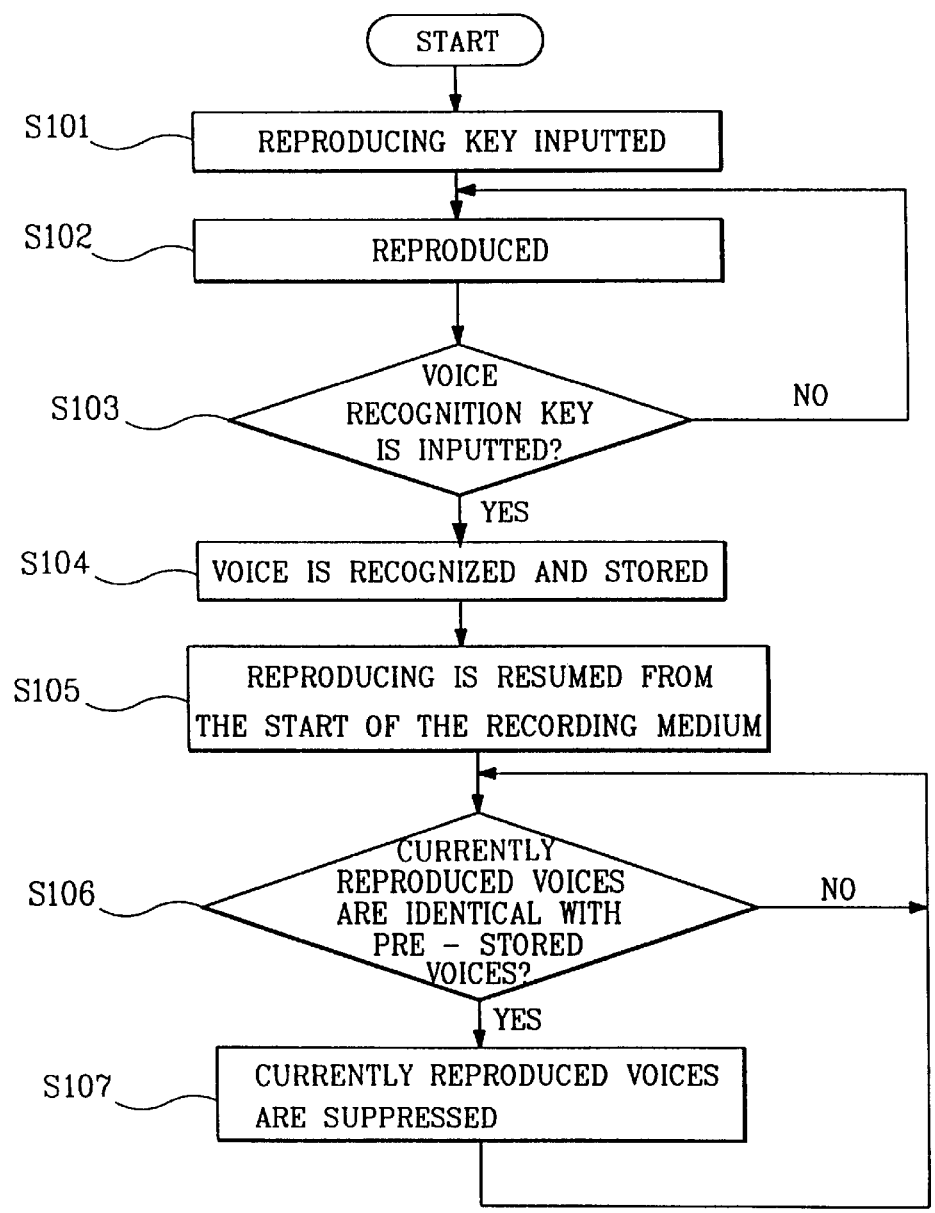
FIG. 2 is a flow chart showing the constitution of the method for reproducing recorded medium according to the present invention.

FIG. 2 is a flow chart illustrating the method for reproducing signals from the recorded medium according to the present invention.

In the present invention, user can listen to the reproduced movies or video programs recorded on the general cassette tapes and video tapes, and learn a language in a conversational form.

First, the control section 19 activates a driving section (not shown in the drawings) upon receipt of an input signal from the reproduction key inputting section 20 (101) so as to reproduce the audio signals of the recorded medium. These audio signals are processed by the audio signal processing section 10, and are supplied to the speaker 15 to produce sounds. Thus the recorded medium is reproduced (102).

Under this condition, the control section 19 switches the first switch 14 to a first terminal.

Thereafter, for the purpose of recognizing the voices to be suppressed during the language learning, a judgment is made as to whether a voice recognition key has been depressed from the voice recognition key inputting section 21 (103).

If it is found upon the judgment that a voice recognition key has been pressed then voices are detected from the output audio signals of the audio signal processing section 10 so as to recognize them and store them (104) (first step).

Under this condition, the control section 19 turns on the second switch 17 in accordance with the input commands of the voice recognition key inputting section 21, so that the audio signals of the voice detecting section 16 are supplied to the voice recognizing section 18.

This voice detecting section 16 consists of a low pass filter which detects the voices by allowing only the audio signals of 300–3400 Hz pass.

After the recognition and storing of the voices, the control section 19 restores the recording medium to the starting position by activating the driving section to reproduce the signals from the first portion of the recording. Learning is carried out in this manner (105).

When the language learning is started (105), the control section 19 compares the currently reproduced audio signals of the voice detecting section 16 with pre-stored voices of the voice recognizing section 18 (106) (second step).

If the two sets of signals are identical with each other, the first switch 14 is switched toward a second terminal.

Therefore, the audio signals which have been supplied from the audio signal processing section 10 to the speaker 15 are suppressed. Instead, the background sounds of the background sound detecting section 11 and the user's voices of the voice inputting section 12 are added together by the adder 13. Then these added signals are output through the first switch 14 to the speaker 15 (107) (third step).

The background sound detecting section 11 consists of a high pass filter to pass the audio signals except the voice signals. Therefore, the user can hear his (or her) own voice together with the background sounds, and thus, animated learning can be carried out.

According to the present invention as described above, during the time when the recorded signals such as movies or music are reproduced from the cassette tape or video tape, if the user wants, particular vocal sounds are suppressed, and his or her own voice can be output together with the background sounds.

In this manner, an actual conversation can be carried out with an actor of the movie, thereby improving learning efficiency.

What is claimed is:

1. An apparatus for reproducing recorded signals from a recorded medium, comprising:

an audio signal processing section for reproducing audio signals;

a background sound detecting section for detecting background sounds from said audio signals output from said audio signal processing section;

a voice inputting section for inputting a voice of a user;

an adder for adding said voice of the user from said voice inputting section to background sounds from said background sound detecting section;

a first switch for selectively outputting said audio signals output from said audio signal processing section and signals output from said adder to a speaker;

a voice detecting section for detecting a voice from said audio signals output from said audio signal processing section;

a voice recognizing section for recognizing and detecting said voice output from said voice detecting section;

a second switch for selectively supplying said voice from said voice detecting section to said voice recognizing section;

a reproduction key inputting section for inputting the user's reproduction commands;

a voice recognition key inputting section for inputting the user's voice recognition commands; and a control section for controlling said first switch in accordance with said reproduction commands, supplying said voice detected by said voice detecting section to said voice recognizing section in accordance with said voice recognition commands, comparing a pre-stored voice stored in said voice recognizing section with said voice from said voice detecting section; and controlling output of said signals from said adder to said speaker by switching said first switch.

2. A method for reproducing recorded signals from a recording medium comprising the steps of:

recognizing particular vocal signals from a recorded signal during reproduction of a recorded signal storing said particular vocal signals;

comparing pre-stored vocal signals with said particular vocal signals;

suppressing said particular vocal signals when said pre-stored vocal signals and said particular vocal signals are identical; and outputting a different vocal signal in place of said particular vocal signals.

3. The method as claimed in claim 2, wherein said step of outputting a different vocal signal comprises the step of outputting a user's vocal signals.

* * * * *